United States Patent Office 2,767,017
Patented Oct. 16, 1956

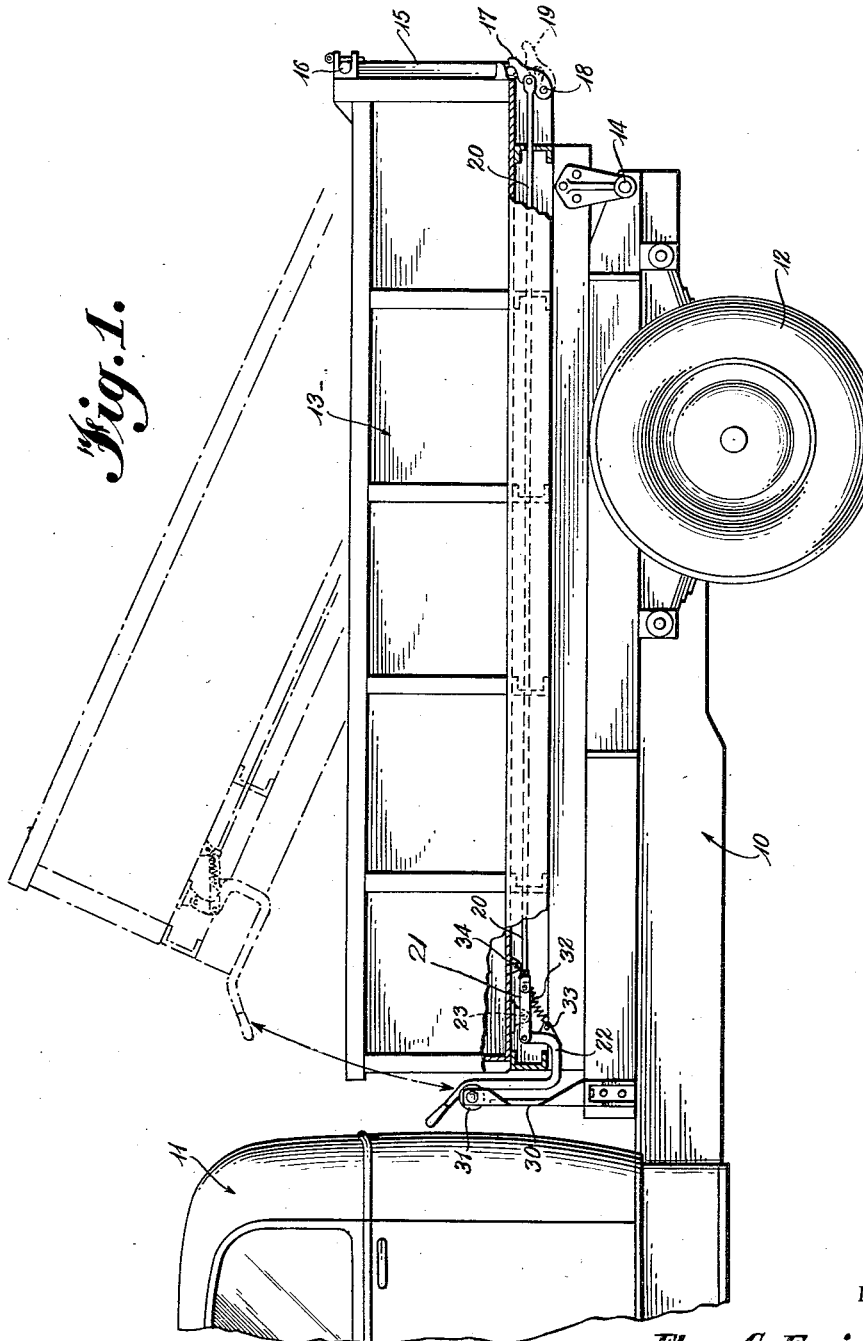

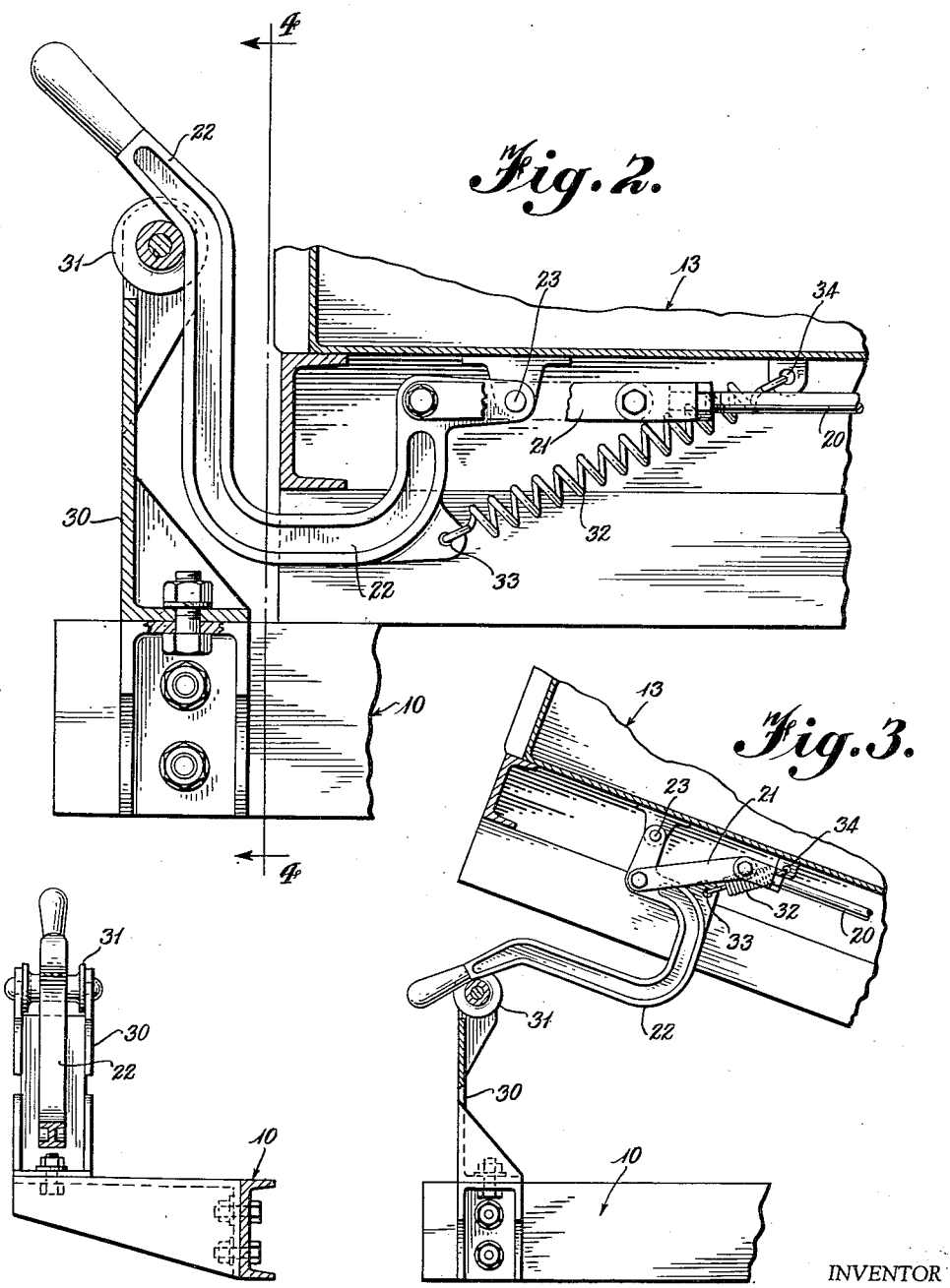

2,767,017
AUTOMATIC END GATE CONTROL FOR DUMP TRUCKS

Elmo G. Enriquez, La Pryor, Tex.

Application August 12, 1953, Serial No. 373,790

1 Claim. (Cl. 298—23)

This invention relates to dump trucks and in particular to an arrangement for automatically locking and unlocking the tail gate of a conventional type of dump truck.

The conventional type of dump truck includes a dump body that is pivoted at its rear end to the rear end of the truck chassis and is adapted to have its front end lifted so that material carried in it will slide downward out of the rear end of the dump body. Across this rear end there is generally a pivoted gate, known as a tail gate. This gate is pivoted at its upper edge to the body and there is a latch means to lock it in closed position when the truck is being filled and during travel. This latch means is then released so that the tail gate can swing open as the dump body is tilted. As a matter of expediency the latch means is ordinarily operated by a lever at the front end of the dump body and the lever is usually connected to the latch means through an over-center type of linkage so that the latch will remain in locked position until the lever is positively operated to release it. Thereafter, the lever must be positively operated in the other direction to re-lock the tail gate.

It is customary in the operation of such a dump truck for the operator to actuate the body tilting mechanism and thereafter to leave the cab of the vehicle and operate the control lever to release the tail gate lock so that the tail gate can swing open. Then, after the load has been dumped and the body lowered into its original position, the operator must again leave the cab and operate the control lever to lock the tail gate.

It is an object of the present invention to avoid the necessity of manually operating this control lever to lock and unlock the tail gate of a vehicle of this type, and to do so without making material alterations in the tail gate lock mechanism or the operating linkage. This is accomplished by the addition to the dump truck structure of a few simple parts that cause the tail gate to be automatically locked when the front end of the dump body is lowered and to be automatically unlocked when the front end of the dump body is raised.

Further details and advantages of this invention will be apparent from a consideration of the accompanying drawings and the following detailed description of the embodiment shown therein.

In the drawings, Figure 1 is a side elevation of a dump truck embodying the preferred form of this invention. Figure 2 is an enlarged detailed view of a part of a construction shown in Figure 1. Figure 3 is a view similar to Figure 2 but showing the front of the dump body in a partially elevated position. Figure 4 is a detailed view of the construction shown in Figure 2 taken on lines 4—4 of Figure 2.

As illustrated in Figure 1, a dump truck consisting of a chassis 10 is provided with the usual cab 11 and wheels 12 and carries a typical dump truck body 13. This dump body 13 is pivoted to the chassis at 14 near its rear end and is adapted to be tilted by being lifted as shown in dotted lines of Figure 1, by mechanism not shown. The dump body 13 is provided with a tail gate 15 pivoted at its upper edge to the dump body at 16, as shown. At the lower edge of the tail gate 15 there is positioned a latch or latches 17. These are pivotally connected to the dump truck body at 18 and arranged to hold the tail gate in closed position when in latching position. The unlocked position is shown in dotted lines at 19. The latching member 17 is operated by a long rod 20 which is articulately connected thereto and extends lengthwise of the dump truck body 13 to a point adjacent the front end thereof. At this point the rod 20 is connected by a link 21 to a manually operated control lever 22 pivotally mounted at 23 on the body and so shaped that when the manually operated control lever 22 is fully rotated in a clockwise direction it will not only lock the tail gate, but will move the link 21 over the center 23, thus tending to maintain the lever 22 in the locked position.

While a single latch of the type shown can be used, it is customary to place a tail gate latch at each side of the body and connect the tail gate latches together through a rod extending transversely of the body at the pivot point 18. Thus the tail gate is latched at both sides by operation of the single control lever 22.

All of the structure thus far described is conventional and it is to an improvement upon this structure that the present invention is directed.

According to the present invention an upstanding arm 30 is mounted on the chassis adjacent the control lever 22 and this upstanding arm 30 carries a rotatable sheave 31 at its upper end, the sheave being so positioned that it will strike the control lever 22 as the dump body is lowered and will push this lever 22 into the locking position as the dump body comes to rest upon the chassis. This effects a latching of the tail gate and maintains the tail gate in a latched position as long as the truck body remains lowered upon the chassis.

In order to provide for the unlocking of the tail gate as the truck body is raised from the chassis, a tension spring 32 is connected from point 33 on the control lever 22 to point 34 on the bottom of the dump truck body. When the dump truck body is lifted from the chassis and the control lever 22 is released, spring 32 rotates this lever and releases the tail gate.

What is claimed is:

In a dump truck in which a dump truck body is mounted on a truck chassis by being pivoted thereto at the rear end, and in which means are provided to lift the front end of the dump truck body to rotate the body about the pivot point and dump the contents out of the rear end of the dump truck body, and in which a tail gate is provided on the dump truck body, which tail gate is pivoted at the top edge and latched at the bottom edge, and in which the latch at the bottom edge of the tail gate is controlled by a generally U-shaped hand-operated lever pivoted to the truck body near the bottom front edge and extending around the bottom front edge and upwardly, and terminating in a handle, when in locked position, the lever being connected to the latch through a link that lies over the fulcrum of the lever when the latch is in latched position, the improvement that comprises an upstanding sheave-bearing arm on the truck chassis positioned to cooperate with the upwardly extending part of the manually pivotable lever to move the lever into locking position when the truck body is lowered onto the chassis, and means attached to the truck body and cooperating with the manually pivotable lever to rotate the lever in the proper direction to release the latch when the truck body is raised from the chassis, said means being such as to exert a force to rotate said lever and said upstanding arm being positioned so as to detain said force as long as the truck body remains in a lowered position.

References Cited in the file of this patent

UNITED STATES PATENTS

| 2,009,466 | Yeager | July 30, 1935 |
| 2,261,745 | Sand | Nov. 4, 1941 |
| 2,552,442 | McClish | May 8, 1951 |